No. 663,271. Patented Dec. 4, 1900.
A. M. HAMILTON.
POCKET FILTER.
(Application filed June 19, 1900.)
(No Model.)
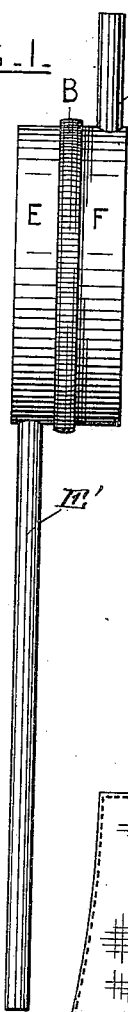
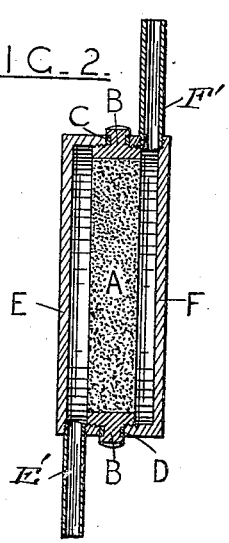
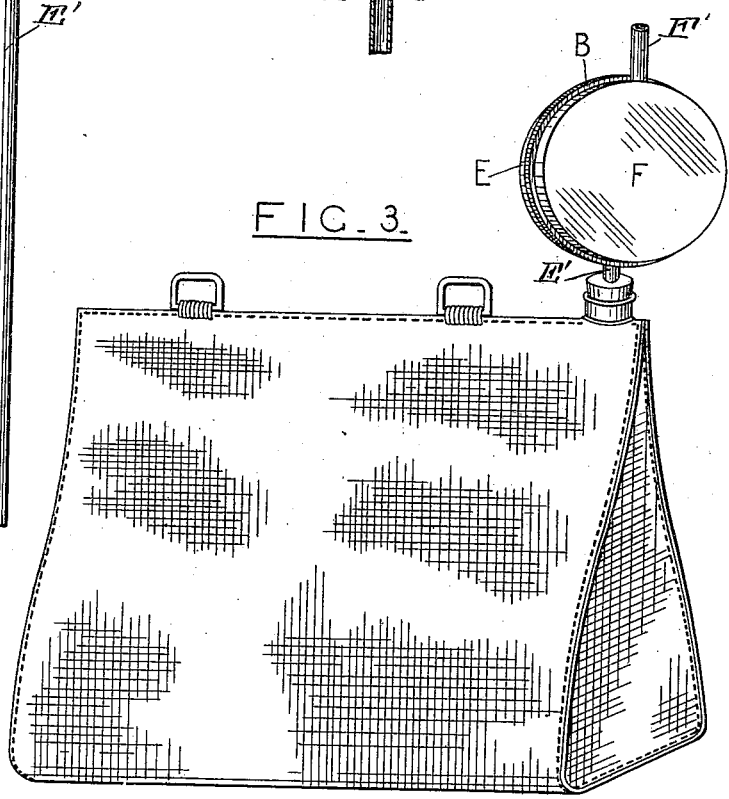
Inventor:
Augusta M. Hamilton.
Witnesses.
By, Attorneys.

UNITED STATES PATENT OFFICE.

AUGUSTA MERIEL HAMILTON, OF MEDINDIE, SOUTH AUSTRALIA.

POCKET-FILTER.

SPECIFICATION forming part of Letters Patent No. 663,271, dated December 4, 1900.

Application filed June 19, 1900. Serial No. 20,810. (No model.)

*To all whom it may concern:*

Be it known that I, AUGUSTA MERIEL HAMILTON, gentlewoman, a subject of the Queen of Great Britain and Ireland, and a resident of No. 12 Robe Terrace, Medindie, in the Province of South Australia, have invented a certain new and useful Improved Pocket-Filter, of which the following is a specification.

This invention is designed to supply a portable means of filtering water by soldiers and others who are compelled to drink water from various sources where more or less impurities are expected to be present. I am aware that attempts have been made to supply such a filter; but all methods heretofore adopted or proposed have, I believe, failed to combine the qualities essential to success—namely, simplicity, durability, compactness, lightness, portable strength, and capacity for being effectually cleansed and disinfected without expense or difficulty.

This invention is especially designed to be used in connection with the canvas water-bag carried by troops in war and by bushmen. As is well known, such bags have an aperture at the top through which the bag is filled and through which the trooper or bushman drinks or pours the water, the aperture being closed by a cork. The adaptation of my filter to this water-bag is one of the special and most valuable features of the invention in the great saving of life which is likely to result therefrom through preventing the absorption into the men's bodies of various disease-germs or impurities which are found in the water.

The filter consists, essentially, of a carbon block permanently secured within a ring, preferably of metal, having a cap secured on each end of the ring, forming a chamber on each side of the carbon block, each chamber having a pipe connected thereto, one forming the inlet and the other the outlet.

In order that my invention may be clearly understood, I will now describe the same with reference to the accompanying drawings, in which—

Figure 1 is an outside view of the filter. Fig. 2 is a central vertical section, and Fig. 3 shows the filter in place for drinking from a water-bag.

The carbon block A is permanently secured within a ring B, the outside of which is screw-threaded on each end and has its central portion raised and milled for the purpose of insuring a better grip when the caps are being screwed off and on. On each side of the said central portion grooves or recesses are formed into which are fitted flexible washers C and D. Caps E and F are screwed one upon each end of the ring, forming chambers against the face of the carbon block, or as an alternative bayonet-joints may be employed. Each of the caps is provided with a tube E' and F', respectively, the tube F' for the outlet being just long enough to hold easily in the mouth, while the tube E' for the inlet is made longer to enable water to be drawn from a bag, the said tube being of sufficient length to reach through the cork to near the bottom of the water-bag, and being screwably detachable may be allowed to remain in the bag or may be removed with the filter for drinking from other vessels, as circumstances dictate. The inlet and outlet pipes E' F' project edgewise of the filter—that is, they depart from the filter within the plane of the outer faces of the caps E F.

The carbon is prepared in a plastic state of a sufficiently-porous nature to allow of the water being drawn through it. The ring in which the carbon is held and the two caps are made, preferably, of aluminium and the flexible washers preferably of asbestos, though other suitable material may be employed.

In operation the top of the long or inlet tube, which projects through the cork of the water-bag, is screwed into the inlet-chamber of the filter and water drawn from the mouth-pipe, which is the short one, and in passing through the carbon disk from one chamber to the other the water is freed from the impurities and disease-germs, which would otherwise be taken into the system.

It will be obvious that this filter may be used for drinking from a stream or other source by removing the inlet-tube from the cork of the water-bag and placing it, for instance, in a stream or pool or any vessel.

Owing to the shape of the carbon block and the construction of the case the cap E, forming the inlet-chamber, can be unscrewed and the carbon block may be brushed or scrubbed and the impurities removed, and when desired the whole filter can be placed in boiling water, and thus adhering germs with certainty killed without affecting any part of the filter.

The shape of the carbon disk and its large surface in comparison to the sectional area of the suction-tubes causes a perfect filtering operation besides affording the cleansing facilities hereinbefore described.

It will be observed that all parts of the filter are of a solid and durable character and construction. They are fitted together, so as to form a compact article suited to the pocket, being little more cumbrous than a watch.

I am aware that pocket-filters of metal employing carbon have been previously adopted of other constructions.

Having now described my invention, what I claim as new, and desire to secure by Letters Patent, is—

1. In a portable or pocket filter, a block of filtering medium such as carbon, having an inlet-chamber on one side and an outlet-chamber on the other side, the inlet-chamber being fitted with an inlet-pipe and the outlet-chamber with an outlet-pipe, the inlet and outlet pipes projecting edgewise of the filter.

2. In a pocket or portable filter, the combination of a block of filtering material such as carbon, having a metallic or other encircling ring screw-threaded on each end, an inlet-chamber screwing onto one end of the said threaded ring, an outlet-chamber screwing onto the other end of the said threaded ring, an inlet-pipe attached to the inlet-chamber, and an outlet-pipe attached to the outlet-chamber, substantially as described.

3. In combination with a portable water-bag, a pocket-filter having a long inlet-tube adapted to pass through the cork into and nearly to the bottom of the water-bag, substantially as described and for the purpose set forth.

4. A filter comprising a block or disk of filtering material, a peripheral holding-ring therefor, the said ring having a raised annular flange whereby to turn the same, and a casing in two parts having threaded engagement with the ring at each side of the annular flange, the said casing forming chambers at opposite sides of the filtering-block, the chambers having respectively an inlet and an outlet opening.

In testimony that I claim the foregoing as my invention I have signed my name, in the presence of two witnesses, this 2d day of May, 1900.

AUGUSTA MERIEL HAMILTON.

Witnesses:
CHARLES NICHOLAS COLLISON,
ARTHUR GORE COLLISON.